Figure 1:
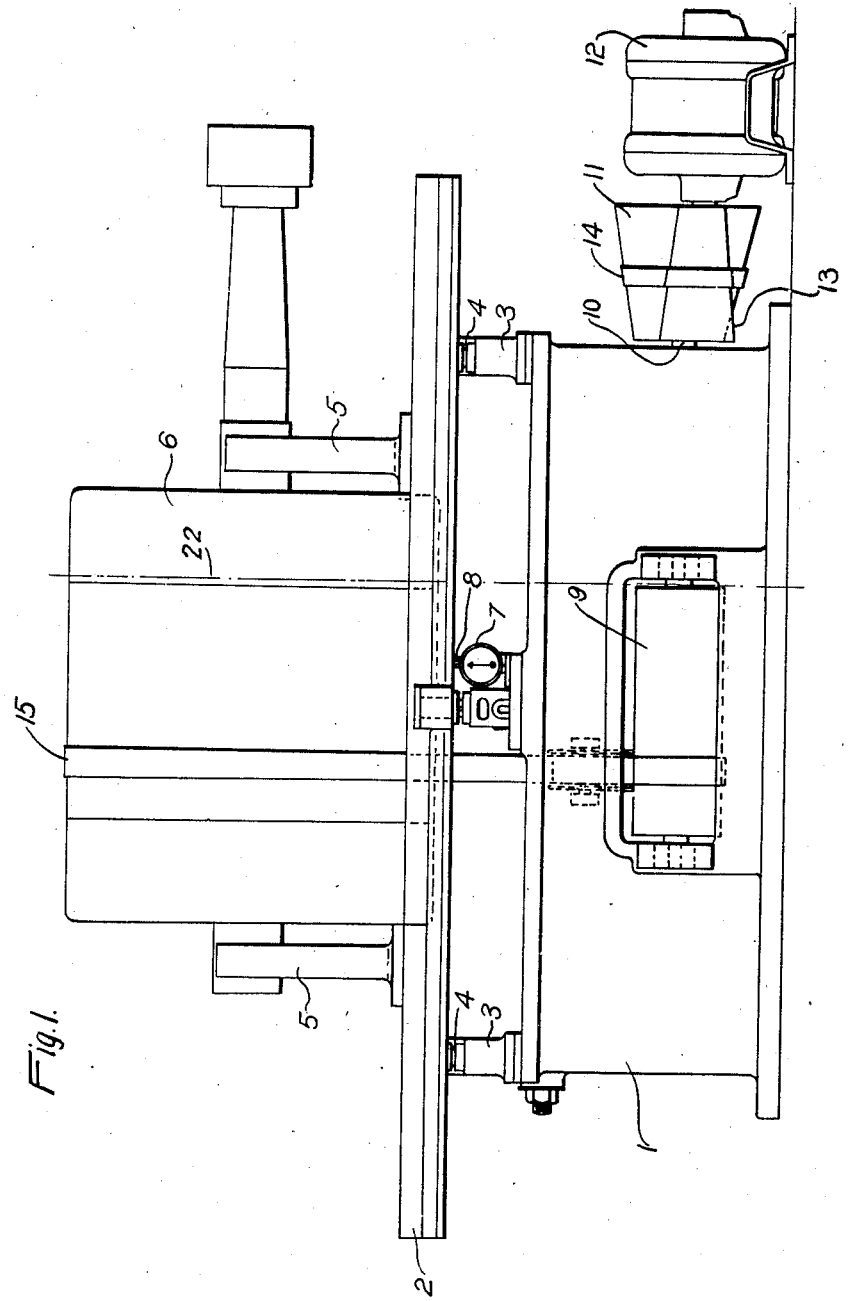

Sept. 17, 1929.   W. E. TRUMPLER   1,728,518
BALANCING MACHINE
Filed Aug. 28, 1925   3 Sheets-Sheet 3

WITNESSES:
A.J.Schiefelbein.
M.B.Jaspert.

INVENTOR
William E. Trumpler.
BY
Wesley G. Carr
ATTORNEY

Patented Sept. 17, 1929.

1,728,518

UNITED STATES PATENT OFFICE

WILLIAM E. TRUMPLER, OF WILKINSBURG, PENNSYLVANIA, ASSIGNOR TO WESTING-HOUSE ELECTRIC & MANUFACTURING COMPANY, A CORPORATION OF PENNSYLVANIA

BALANCING MACHINE

Application filed August 28, 1925. Serial No. 53,116.

My invention relates to balancing machines, more particularly to dynamic balancing machines for detecting parasitic masses in rotating bodies, such as rotors and the like.

It is among the objects of my invention to provide a balancing machine of simple, compact and durable mechanical construction which shall comprise a minimum number of operating parts and which shall be particularly adapted for balancing or testing unbalance in rotors manufactured in production quantities, with a minimum of expense.

Another object of my invention is to provide a balancing machine in which the oscillatable bed member is supported upon leaf spring elements of such type as restrain the bed member against oscillatory movement in a vertical direction as well as radial movement from the axis of oscillation, and in which the spring elements are designed to be arranged in such manner that their planes of symmetry extending parallel to the faces of the springs intersect at a line constituting the axis about which the bed member oscillates.

Heretofore, balancing machines commonly utilized spring elements of the coil-shape type, which were conducive to vertical oscillations resulting from the impulses set up by the parasitic masses in the rotating body that was journalled on the bed member. With this type of spring mounting it was difficult to provide proper driving facilities for the rotor that was mounted on the bed member, since no adequate driving connections to a prime mover could be provided unless the latter were mounted upon the bed itself. This is an undesirable condition for many reasons, the principal one of which is the accumulation of an excessive mass on the bed member, which detracts from its sensitiveness to the impulses of the unbalanced masses acting upon it.

My present invention contemplates the provision of a spring action that provides freedom of motion of the bed member in an angular direction about a vertical axis, by means of which the bed member will oscillate in a horizontal plane, and with this arrangement it is a simple matter to provide driving connections between the rotor to be tested and a prime mover, as by the usual belt drive.

This structure lends itself to simplicity in design, and permits rugged mechanical construction, thus assuring a stable balancing element that retains its initial adjustment under severe operating conditions.

In practicing my invention, I employ a stationary base member adapted to support a bed that is provided with pedestals for rotatably mounting a rotor to be tested. I utilize a plurality of flat spring elements, which are disposed intermediate the base and bed member and which are mounted in a manner to provide relative angular adjustment of the faces of the springs. The purpose of adjusting the spring elements is to change the location of the axis of oscillation with respect to any transverse plane of the rotor to be tested, for the purpose of ascertaining the degree of unbalance in any two transverse planes of such rotor, in accordance with a familiar practice.

Figure 2:
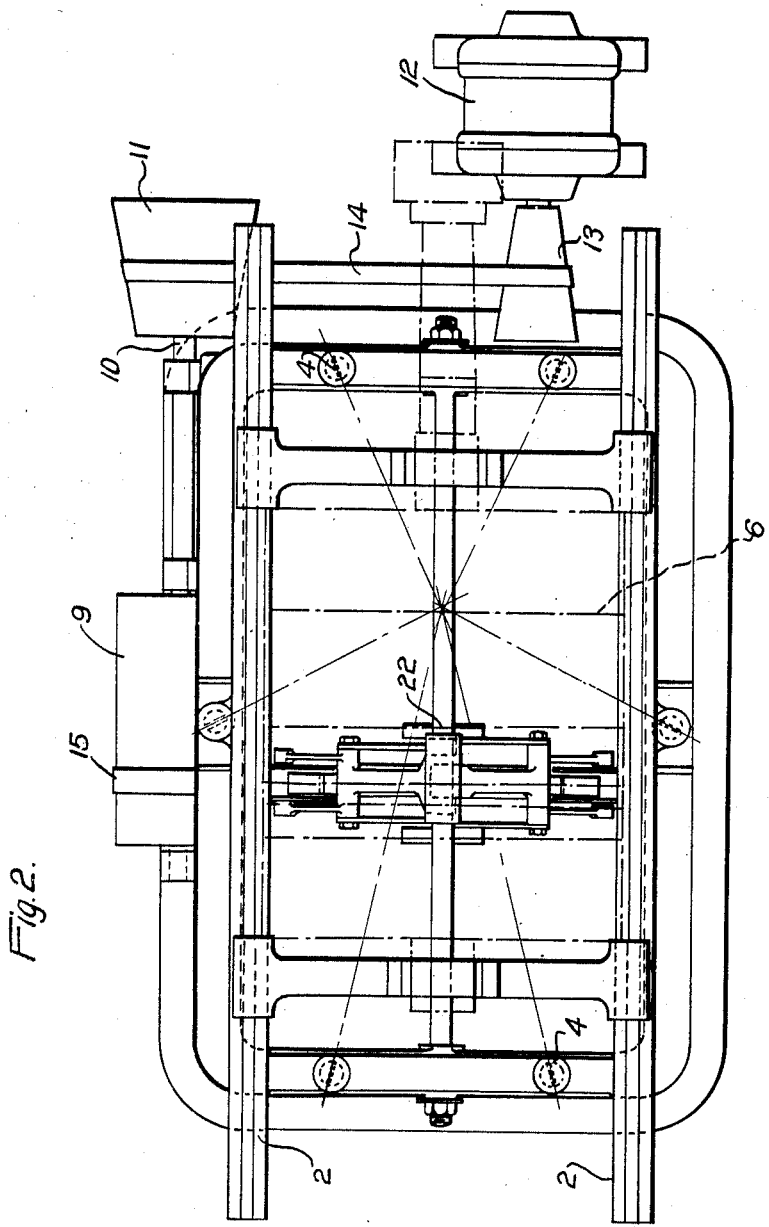
Figure 3:
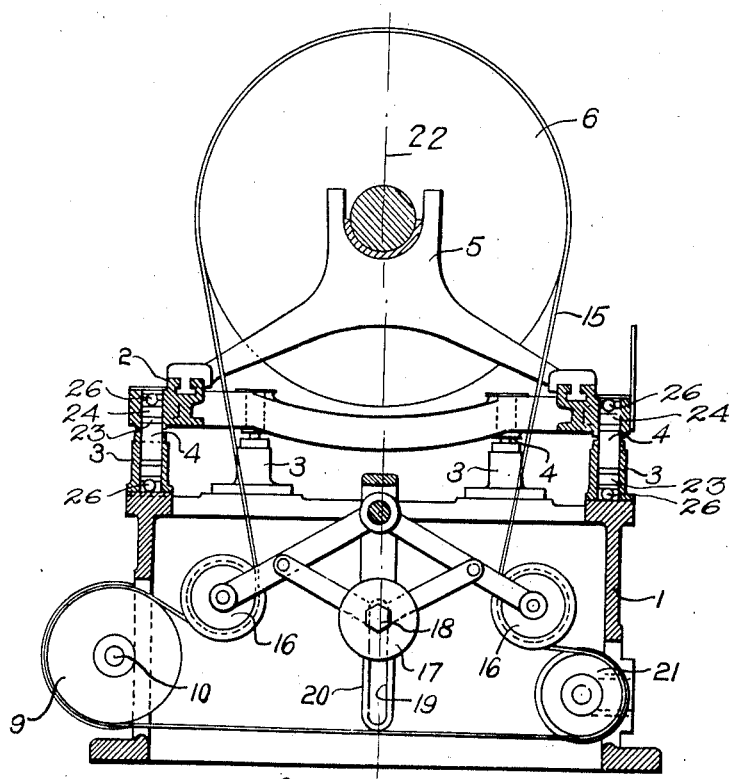
Figure 4:
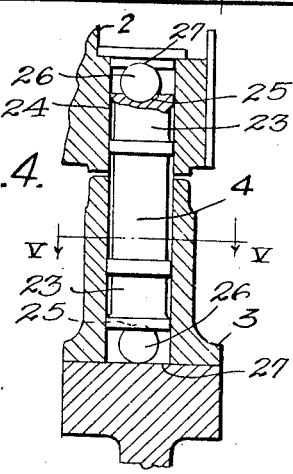
Figure 5:
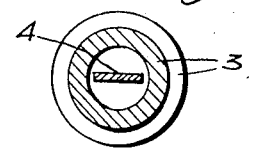

In the accompanying drawings, constituting a part hereof and in which like reference characters designate like parts, Figure 1 is a view in side elevation of a balancing machine embodying the principles of my invention, Fig. 2 is a plan view thereof, Fig. 3 is a view, partially in section and partially in end elevation, of the balancing machine shown in Figs. 1 and 2, Fig. 4 is a view partially in section and partially in elevation of one of the spring supporting members embodied in the balancing machine, and Fig. 5 is a sectional view of the supporting member taken on the line V—V of Fig. 4.

Referring to the drawings, the apparatus therein illustrated comprises a base member 1, which is adapted to be secured to a suitable foundation, a bed member 2, adapted to be supported by said base member, a plurality of standards or pedestals 3 that are mounted on the base 1 and adapted to receive vertically disposed flat spring elements 4, which serve to support the bed member 2, and a pair of pedestal journal bearings 5, which are secured to the bed member 2 and adapted to rotatably journal a rotor 6 to be tested. A dial or other suitable indicator 7 is mounted upon the base 1 in such manner that its contact member 8 engages a portion of the bed member 2, by means of the usual bell crank connection so that any oscillatory motion of the latter will be registered by the dial.

A pulley 9 of relatively wide face is journalled at one side to the frame of the base 1, by means of a shaft 10 having a cone pulley 11 mounted on one end thereof. A motor 12, having a cone pulley 13 secured on its extended shaft portion, is mounted in working alinement with the pulley 11, and a drive belt 14 connects the pulleys 11 and 13 to transmit motion from the motor to the shaft 10. A drive belt 15 is disposed around the pulley 9 and the rotor 6 that is journalled on the bed member 2. The belt member 15 constitutes an endless belt that traverses a pair of tension wheels 16, which are rotatably mounted upon the frame of the base 1 and are held against the belt 15 by the gravity effect of a weight 17 that is secured by a bolt 18 in a guide slot 19 of a vertical bracket 20 that is fastened to the base 1. The belt also passes over an idler pulley 21 that is secured to the base 1 in alinement with the pulley 9 on the opposite side of the base frame.

In order that the bed member 2 may be permitted to oscillate in a horizontal plane, the flat springs 4 are disposed within the pedestals 3 in such manner that they may be turned about their longitudinal axes to cause their planes of symmetry to intersect in a vertical oscillation axis 22.

As shown in Figs. 3 and 4 the springs 4 are provided at their ends with cylindrical portions 23 by means of which they are rotatably mounted within the pedestals 3 and likewise are disposed to rotatably engage cylindrical recesses 24 in the lower surface of the bed member 2.

In order that the springs may be turned readily while the bed member 2 is loaded with a rotor 6, the end portions 23 of the springs 4 are provided with cup like depressions 25 which engage steel balls 26 that bear upon corresponding cup like depressions 27 in the bottom of the pedestals 3 and the cylindrical recesses 24, respectively.

When it is desired to position the oscillation axis 22, the springs 4 may be turned by means of a suitable wrench within the pedestals 3 in such manner that their planes of symmetry parallel to their flat faces intersect in a predetermined common vertical line or oscillation axis 22, as best shown in Fig. 2. The frictional resistance between the cylindrical end portions 23 of the springs 4 and the pedestals 3 is sufficient to prevent them from becoming accidentally misaligned when the balancing machine is in operation.

Obviously, the springs 4 may be adjusted to position the axis of oscillation in any predetermined vertical line, however, it is generally desirable to confine the axis of oscillation to some position along the axis of rotation of the rotor 6 to be tested.

With such disposition of the spring elements, the bed member is restrained against movement in any plane excepting angular movement around the oscillation axis 22, the line of intersection of the planes of the spring leaves, this movement occurring in a horizontal plane. This oscillation axis is first brought into one of the two transverse "correcting" planes of the rotor to be balanced. Since it is desirable for accurate balancing to make corrections in at least two of such transverse planes, it will be necessary to adjust the spring elements for two corresponding positions, the planes chosen being preferably the end faces of the rotor, where correction for unbalance is most readily performed, as by the removal or addition of correction weights, which is customary in practice.

The operation of my device is similar to that of other well-known balancing machines, in that the rotor mounted on the movable bed is rotated at a suitable speed through the belt drive mechanism, by the motor 12. Any unbalanced or parasitic mass in the rotor will induce impulse in the bed member 2 which, by virtue of the nature and disposition of the spring elements, will set up an oscillatory movement of the bed about an oscillation axis that is determined by the disposition of the spring elements, as heretofore explained.

The dial indicator 7, being in contact with the frame of the bed member 2, will indicate the oscillations of the latter and the amplitude or degree of vibration set up by the unbalanced mass of the rotor, thus indicating the degree of unbalance, which is compensated for by the temporary application of balancing weights to counteract or offset the unbalance, in accordance with a familiar practice.

When one end of the rotor has been balanced in this manner, as indicated by the absence of oscillatory motion in the bed, the oscillation axis is shifted to the other transverse plane about which a test for balance is to be made, by adjusting the spring elements as heretofore explained; and the balancing operation is repeated for the other end of the rotor.

When the rotor has been fully balanced, permanent correction weights may be applied or material removed either while the rotor is on the machine bed or after it is removed to a more convenient location.

Instead of adjusting the spring members 4 for the purpose of shifting the oscillation axis of the balancing mechanism, it may be convenient to retain a permanent setting of the spring elements and shift the pedestal journals 5, which support the rotor to be tested, on the bed member 2 in a longitudinal direction. This procedure will be just as effective as the adjusting of the spring elements themselves. However, in any instance the principle upon which the balancing mechanism operates will be the same. It is a matter of the provision of suitable and adequate means for handling the particular type of objects to be tested, as to which of these schemes will be most expedient in facilitating the balancing operation.

It is evident from the foregoing description of my invention that balancing machines, for dynamically balancing rotors and the like, made in accordance therewith provide simple and effective means for testing rotors of any size and shape in an efficient and in expensive manner, and that by virtue of their simplicity, such machines may be constructed at a relatively low proportion of the cost of the more intricate and complex machinery heretofore proposed.

Although I have described a specific embodiment of my invention, it will be obvious to those skilled in the art that various modifications may be made in the details of construction, in the size and proportion of the several co-operating parts and in the specific arrangement of the several elements embodied therein, without departing from the principles herein set forth.

I claim as my invention:

1. A balancing machine comprising a base, a bed member carried by said base, a plurality of flexible elements disposed intermediate said base and bed, means for journalling a rotor to be tested on said bed, and means for actuating said rotor to rotate the same, the relative disposition of said flexible elements being adapted to permit an oscillatory movement of said bed about a predetermined axis perpendicular to the base.

2. A balancing machine comprising a base, a bed member carried by said base, a plurality of flexible elements disposed intermediate said base and bed, means for journalling a rotor to be tested on said bed, and means for actuating said rotor to rotate the same, the relative disposition of said flexible elements being adapted to permit an oscillatory movement of said bed about a predetermined vertical axis.

3. A balancing machine comprising a base, a bed member carried by said base, a plurality of angularly adjustable flexible elements disposed intermediate said base and bed, means for journalling a rotor to be tested on said bed, and means for actuating said rotor to rotate the same, the relative disposition of said flexible elements being adapted to permit an oscillatory movement of said bed about an axis determined by the intersection of the main planes of said flexible elements.

4. A balancing machine comprising a base, a bed member carried thereby, a plurality of flat spring elements disposed intermediate said base and bed, said springs being adjustable to cause their longitudinal planes extending parallel to their flat faces to converge to determine a rotation axis, means for journalling a rotor to be tested on said bed, means for actuating said rotor to rotate the same, and means comprising said spring elements for restraining movement of said bed in all directions except substantially tangentially to said axis.

5. A balancing machine comprising a base, a bed member carried thereby, a plurality of flat spring elements disposed intermediate said base and bed, said springs being adjustable to cause their longitudinal planes extending parallel to their flat faces to converge to determine a rotation axis, means for journalling a rotor to be tested on said bed, means for actuating said rotor to rotate the same, indicating means for ascertaining the degree of movement of said bed, and means comprising said spring elements for restraining movement of said bed in all directions except substantially tangentially to said axis.

6. An oscillating system for a balancing machine comprising a base, a plurality of leaf springs mounted perpendicular to the base and a bed member carried by the leaf springs, said leaf springs being disposed to be adjusted to lie in planes that radiate from any predetermined axis of oscillation.

7. A spring system comprising a plurality of flexible beams that are disposed to be adjusted in such manner that the planes containing the neutral axes of the beams may be caused to intersect in any line that is parallel to all of said planes.

8. In a balancing machine, the combination with a supporting base, of a plurality of leaf springs mounted perpendicular on said base and disposed to be adjusted to lie in planes that intersect at a common axis, and a vibrating bed mounted on the leaf springs.

9. A balancing machine comprising a base, a plurality of leaf-spring members mounted vertically on the base and a bed member mounted on the leaf-spring members for oscillatory movement, said spring members being adjustable relative to one another to permit the setting of their planes to intersect along a common line.

10. A balancing machine comprising a base, a plurality of beam spring members mounted on the base, and an oscillatable bed member mounted on the spring members, said beam spring members being disposed to be turned so that the planes occupied by their neutral axes will intersect in any predetermined line parallel to said planes to constitute the axis of oscillation of the balancing machine.

11. A balancing machine comprising a base, a bed member carried by the base and a plurality of flexible elements disposed between the base and the bed member, said flexible elements being disposed to be adjusted to permit the bed member to oscillate relative to the base in a horizontal plane about a vertical axis in any position.

In testimony whereof, I have hereunto subscribed my name this 6th day of August 1925.

WILLIAM E. TRUMPLER.